(12) United States Patent
Singh et al.

(10) Patent No.: US 10,044,603 B1
(45) Date of Patent: Aug. 7, 2018

(54) ROBUST FAST RE-ROUTING FOR LABEL SWITCHING PACKETS

(71) Applicant: Amazon Technologies, Inc., Seattle, WA (US)

(72) Inventors: Bijendra Singh, Cedar Park, TX (US); Kiran Kalkunte Seshadri, Cedar Park, TX (US); Kari Ann O'Brien, Austin, TX (US); Thomas A. Volpe, Austin, TX (US); Thomas Bradley Scholl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/085,932

(22) Filed: Mar. 30, 2016

(51) Int. Cl.
| | | |
|---|---|---|
| *H04L 1/00* | (2006.01) | |
| *H04L 12/707* | (2013.01) | |
| *H04L 12/723* | (2013.01) | |
| *H04L 12/937* | (2013.01) | |
| *H04L 12/741* | (2013.01) | |

(52) U.S. Cl.
CPC .............. *H04L 45/22* (2013.01); *H04L 45/50* (2013.01); *H04L 45/74* (2013.01); *H04L 49/254* (2013.01)

(58) Field of Classification Search
CPC ....... H04L 45/29; H04L 45/50; H04L 47/825; H04L 41/0654

USPC .......................................................... 370/218
See application file for complete search history.

(56) References Cited

U.S. PATENT DOCUMENTS

| | | | |
|---|---|---|---|
| 7,961,600 B2 * | 6/2011 | Filsfils | H04L 45/04 370/218 |
| 9,049,142 B1 * | 6/2015 | Osborne | H04L 45/28 |

OTHER PUBLICATIONS

U.S. Appl. No. 15/085,823, filed Mar. 30, 2016, Titled: Non-Recirculating Label Switching Packet Processing.

* cited by examiner

*Primary Examiner* — Chi H Pham
*Assistant Examiner* — Alexander O Boakye
(74) *Attorney, Agent, or Firm* — Kilpatrick Townsend & Stockton LLP

(57) ABSTRACT

A fast reroute (FRR) implementation utilizes an optimized FRR table to implement a fast switchover to a backup link upon detecting a primary link failure on a label switched path (LSP). The switchover can be performed in a negligible amount of time (close to zero milliseconds) based on a backup indicator flag which can be dynamically updated. The FRR table stores pre-determined backup egress interfaces and FRR labels corresponding to primary egress interfaces to minimize the switchover time.

20 Claims, 12 Drawing Sheets

ROBUST FAST RE-ROUTING FOR LABEL SWITCHING PACKETS

BACKGROUND

Modern data networks carry different types of services, e.g., voice, video, streaming music, web pages, email, etc. Label switching (LS) provides data carrying services for communication networks that direct data from one network node to the next based on labels rather than network addresses. The labels identify virtual links between two nodes rather than end points. Label switching approach is used in Frame Relay, Asynchronous Transfer Mode (ATM) and Multiprotocol Label Switching (MPLS) protocols. MPLS traffic engineering (MPLS-TE) provides an enhancement to the MPLS primarily aimed at offering "engineered" traffic paths or MPLS-TE tunnels, also known as label switched paths (LSPs). MPLS-TE provides efficient way of forwarding traffic throughout the network, avoiding over-utilized and under-utilized links. In addition, MPLS TE aims at providing higher level of quality to service providers by offering higher degree of path protection. For example, backup paths can be pre-determined for physical paths, links or nodes through an MPLS-TE LSP so that a primary link or node can be switched to its backup link or node if the primary path fails.

The switchover from the primary link to the backup link is referred to as Fast Re-route (FRR). Various mechanisms are known that can be used for FRR implementations. However, the known FRR implementations are very hardware and compute resource intensive and can overburden the CPU (central processing unit). This can result in significant traffic drop, which can get worse for higher link capacity.

BRIEF DESCRIPTION OF THE DRAWINGS

Various embodiments in accordance with the present disclosure will be described with reference to the drawings, in which.

DETAILED DESCRIPTION

Figure 1:
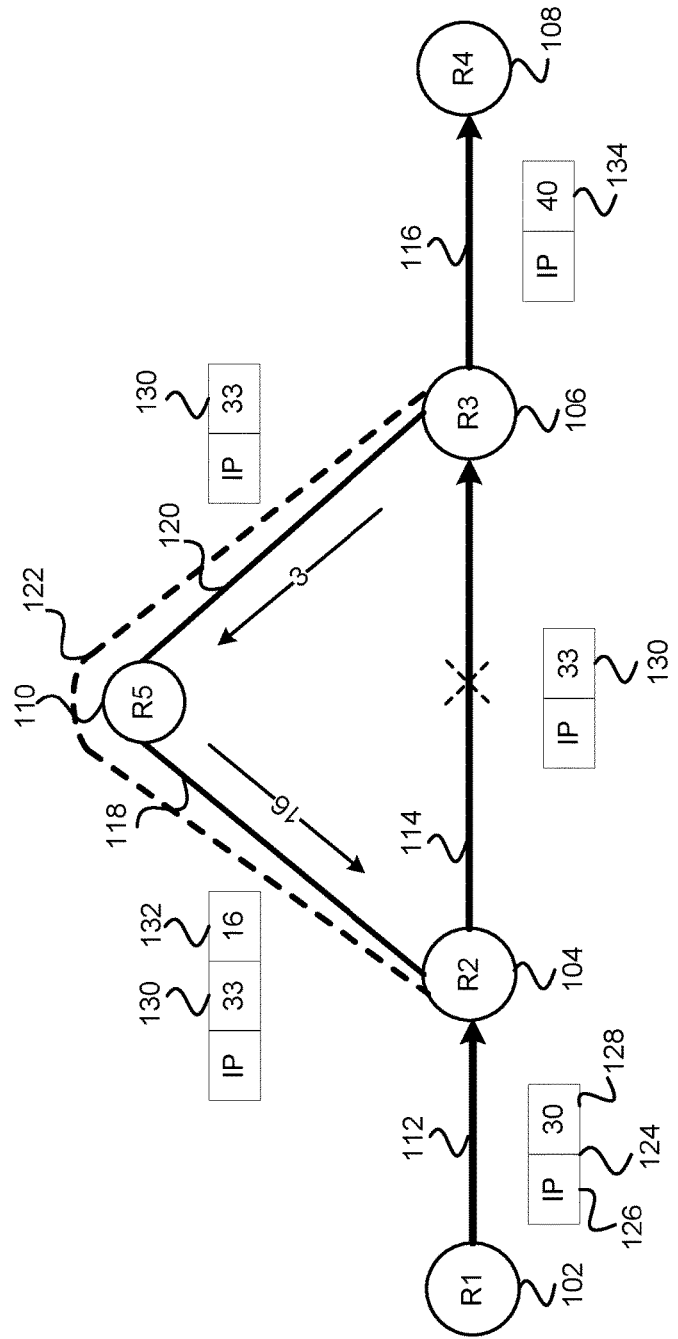
FIG. 1 illustrates a link protection mechanism using fast re-route (FRR) implementation for a label switched path (LSP).

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Label switching (LS) provides a mechanism to direct packets from one network node to another network node using labels. In label switching, each packet is assigned a label number and the switching takes place after examination of the label assigned to each packet. In a label switching path (LSP), a different label can be used for each hop, and can be chosen by a router or a switch performing the forwarding operation. Multiprotocol label switching (MPLS) is a specific implementation of label switching. An ingress label edge router (LER) or an ingress node can encapsulate a packet with a label for routing across a label switched path (LSP) or a tunnel. In some instances, a label switched header can be imposed on top of a header of the packet. For example, the packet may be an Internet Protocol (IP) packet comprising an IP header. An egress LER or egress node can remove the label and can forward the IP packet to its final destination. A label switching router (LSR) can provide switching in the middle of the LSP. For example, the LSR can remove a switching label attached to the packet and can impose a new switching label before forwarding the packet to the next hop on the LSP. In some instances, the packet can include multiple labels, e.g., a label stack. The LSR can also be called a transit node.

A node can be a connection point in a network. A node may be capable of creating, receiving, or transmitting information over a communication network. For example, a node can include a switch, a router, a hub, a bridge, a computer, a server or any suitable network device. A network device can be any device capable of communicating with another device on a communication network using a network interface. Some non-limiting examples of a network device may include a switch, a router, a hub, a node, a network interface card (NIC), etc. In this specification, terms "node", "router" or "switch" may be used interchangeably. In some instances, a node may fail or may not operate, e.g., may not receive, forward or route packets as expected. The node may not operate due to a hardware, software or human error. For example, the node may fail due to power outages, network congestion, failed software and firmware upgrades or patches, hardware failure, operational human error or mismanagement of the device, device configuration changes, unprecedented natural disasters, etc.

A link or a network link can be a connection between two nodes in a computer network. A non-limiting example of a computer network can include the "Internet." In computer networks, nodes can exchange data with each other using a link. For example, a link between the nodes can be established using a cable media (e.g., coaxial cable, optical fiber, twisted pair wire) or wireless media (e.g., cellular network, communication satellites, Wifi). A link can be specified using a transmission speed, e.g., one Gigabits/second (1 G), ten Gigabits/second (10 G), etc. In some instances, a link may fail or may not operate. For example, the link may fail due to fiber cable cuts, power outages, network congestion, operational human errors, server hardware failure, unprecedented natural disasters, faults or errors in network devices, etc. In some instances, a link failure can occur between specific interfaces of two nodes. In some instances, a link failure can be detected using a bidirectional forwarding detection (BFD) protocol.

An egress interface may be associated with an interface of a network device through which a packet can exit the network device. In some instances, the egress interface may include a logical interface or a physical interface of the network device. For example, the logical interface may be mapped to a physical interface of the network which may be associated with a network port (e.g., Ethernet). In some implementations, one or more logical interfaces may be mapped to the same physical interface or the network port. In some implementations, the egress interface can be mapped to a physical port or a network port (e.g., an Ethernet port) using a link aggregation control protocol (LACP).

Fast re-route (FRR) allows link protection and node protection for an LSP path in an event of a link or node failure. When the FRR is enabled, backup paths can be pre-computed and pre-established along the LSP. In some implementations, the backup paths can be stored in an FRR table in a memory. For example, the FRR table may include FRR labels and indicators of backup egress interfaces corresponding to primary egress interfaces. The FRR label may be used to route the packet to a pre-configured backup path using a corresponding backup egress interface in case of a link failure or a node failure. In a facility backup or a next-hop backup (NHOP) implementation, a link can be backed up by another physical link. In a next-next-hop backup (NNHOP) implementation, a node in the LSP can be backed up by another node to completely bypass it in case of a failure. Generally, every backup link has an FRR label which can be imposed on the packet before the packet is forwarded to a preconfigured backup link. The FRR label can be popped up by a node on the backup route before forwarding the packet to its desired destination.

Some FRR implementations may utilize duplicate tables for storing the labels for the primary link and the labels for the backup link (e.g., FRR labels). For example, a first table may store labels for the primary link and corresponding egress interfaces, and a second table may store FRR labels for the backup link and corresponding backup egress interfaces. However, duplicate tables may consume a lot of storage and compute resources. For example, in case of a link failure, parallel look up of the two tables may be required, which can cause CPU (central processing unit) overhead and may introduce high latency in the CPU pipeline. This can result in traffic drop as the CPU performs the management and maintenance of the duplicate tables. Thus, this type of FRR implementation may be very resource intensive.

In some FRR implementations, the FRR tables may be updated dynamically upon detection of link failures. For example, when a link failure is detected, a backup path may be calculated and programmed in the FRR tables for a fast switchover to the backup path. This approach may require detection and reprogramming of alternate routes dynamically as LSPs change frequently. Thus the CPU may need to perform lengthy and complex computations for dynamically updating the FRR tables which can result in a significant amount of traffic drop upon a link failure.

Various embodiments of the disclosed technologies can allow switching the traffic to a backup link in a negligible amount of time upon detecting a link failure. For example, according to some embodiments, the switchover time may be close to zero milliseconds. In addition, the embodiments can provide extremely resource optimized implementation of the fast re-route (FRR) features. According to the embodiments, all the backup paths can be pre-programmed and the switchover from a primary link to a backup link can be performed based on a value of a backup indicator stored in a memory or a register. For example, the backup indicator can include a binary field and a first value (e.g., "1") of the binary field can indicate that the primary link is not operating and a second value (e.g., "0") of the binary field can indicate that the primary link is operating. Thus the embodiments can provide negligible traffic drop upon detecting the link failure as the switchover can happen in a minimal amount of time.

Embodiments of the technology can utilize and maintain a small FRR table which can be managed and updated with minimum CPU overhead. All the backup paths can be pre-programmed and stored in the FRR table. The FRR table can be implemented as a buffer, a register, an on-chip memory or a discrete memory. The backup paths may include backup egress interfaces for routing the packets to alternate paths or tunnels. The backup indicator can be stored in the FRR table and can be updated by the CPU or an independent controller after detecting a link failure. For example, the link failure information can be received from a high priority event queue. The CPU or the controller can update the value of the backup indicator to indicate that a fast re-route needs to be performed. Based on the value of the backup indicator (e.g., if the backup indicator is "1"), an FRR label can be attached to the packet and a pre-programmed backup egress interface associated with the backup link can be used to route the packet in place of an egress interface associated with the primary link. The embodiments utilize negligible resources for implementing the FRR features thus freeing up the CPU to perform other important tasks.

In some embodiments, the FRR table can also store Destination Media Access Control (DMAC) addresses for the corresponding backup egress interfaces. The DMAC address can provide a network address for a network device. For example, each DMAC address in the FRR table may correspond to a physical address of a network device on an LSP. The DMAC address corresponding to a backup egress interface can be used for routing the packet to a backup link via a physical port mapped to the backup egress interface.

According to the embodiments, the FRR implementation can allow automatically rerouting of the traffic on an LSP upon a link failure in the LSP, thus reducing the loss of packets traveling over the LSP. Further, embodiments can provide an extremely resource optimized FRR implementation which makes use of a small FRR table (e.g., 256 entries). Having pre-programmed backup routes can save precious CPU cycles for other important tasks and can allow the switchover to a backup link in a negligible amount of time.

FIG. 1 illustrates a link protection mechanism using fast re-route (FRR) implementation for a label switched path (LSP). An LSP can include a plurality of network devices, e.g., edge routers (e.g., ingress and egress nodes) and label switching routers (e.g., transit nodes). Network devices on an LSP can communicate with one another via links. FRR link protection implementation can allow backing up a link by another physical link. When a link between two network devices fails for some reason, the traffic can be routed via a backup tunnel using an FRR label. The FRR label on the backup tunnel can be pre-configured so that the packets at the terminating end of the protected path of the LSP arrive exactly with the same label as if they have arrived over the primary link. This can be achieved using penultimate hop popping (PHP) functionality by signaling through implicit null label by the router at the terminating end of the protected path of the LSP. The primary link and the backup link generally originate at the same router and the backup link can go through many intermediate hops before terminating where the primary link terminates. Link protection mechanism where a primary link is protected by another physical link can also be called a facility backup or a next-hop (NHOP) backup.

As illustrated in the figure, a system 100 can include a router R1 102, a router R2 104, a router R3 106 and a router R4 108 on a first LSP. The router R1 102 and the router R2 104 can communicate via a link 112. The router R2 104 and the router R3 106 can communicate via a link 114. The router R3 106 and the router R4 108 can communicate via a link 116. The links 112, 114 and 116 may be established using a cable media (e.g., coaxial cable, optical fiber, twisted pair wire), wireless media (e.g., cellular network, communication satellites, Wifi) or any suitable mechanism. In some instances, link protection between the router R2 104 and the router R3 106 can be established by implementing a backup tunnel 122 via a router R5 110. For example, a backup link 118 may be established between the router R2 104 and the router R5 110 and a backup link 120 may be established between the router R5 110 and the router R3 106. The backup links 118 and 120 may be established using the same or different implementation mechanism as the links 112, 114 and 116.

Figure 2:
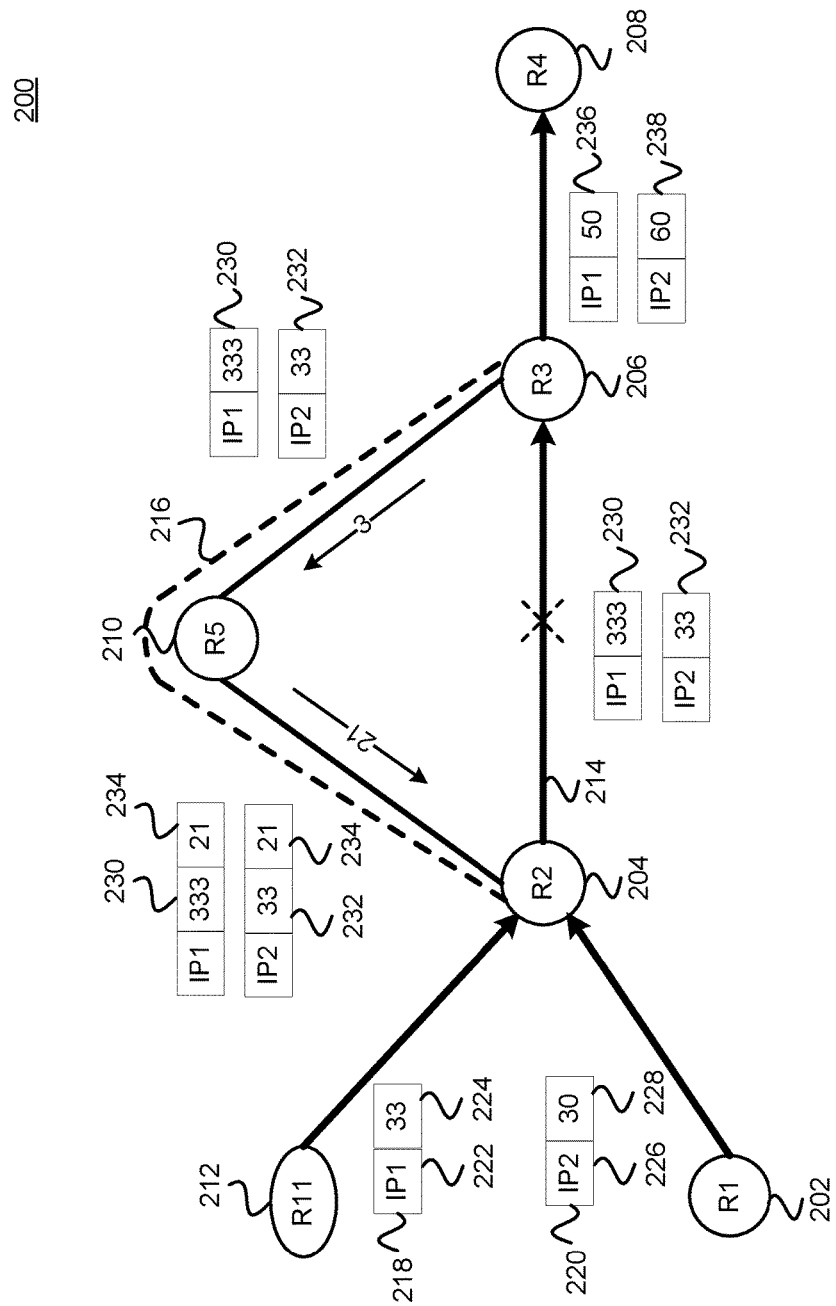
FIG. 2 illustrates a link protection mechanism using FRR implementation for two LSPs.
Figure 3:
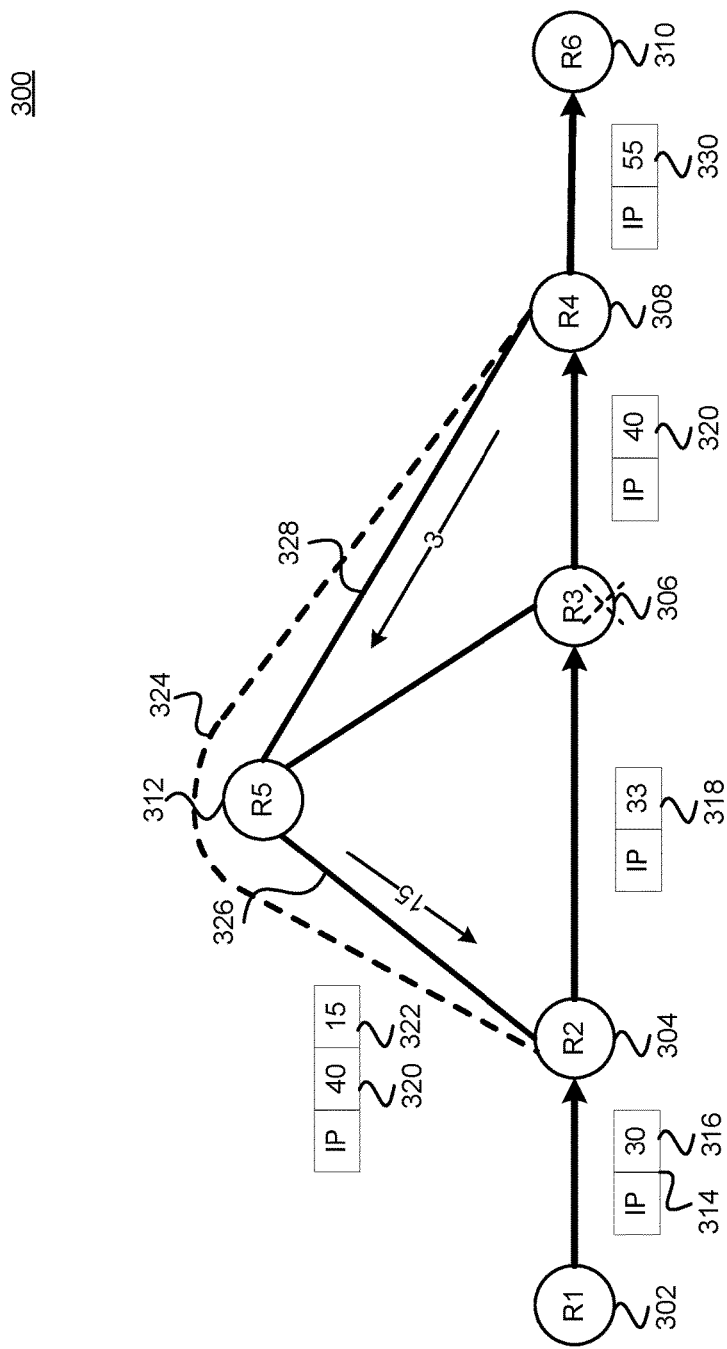
FIG. 3 illustrates a node protection mechanism using FRR implementation for an LSP.

The router R1 102 may be configured to forward a packet 124 to the router R2 104 via the link 112. The packet 124 may be a label switching (LS) packet comprising a LS packet header. The LS packet header may include a label. A label switching packet can allow switching of labels assigned to each packet. The label can be used to look up a next-hop node on the LSP. For example, the packet 124 may include a switching label 128 attached to an IP packet 126. In one instance, the router R1 102 may be an ingress edge router that may be configured to receive an ingress IP packet (not shown). The router R1 102 may provide the packet 124 by encapsulating the IP packet 126 with the switching label 128 for routing on the first LSP. For example, the switching label 128 may include a value "30." In another instance the router R1 102 may be a label switching router that may be configured to receive a packet and to switch the label of the ingress packet with the label 128 to forward the packet 124 to the next hop on the first LSP. Note that FIGS. 1-3 are discussed using an IP packet but it will be understood that any suitable protocol can be supported, e.g., Ethernet, Asynchronous Transport Mode (ATM), frame relay, etc.

The router R2 104 may be a label switching router that may be configured to receive the packet 124 and to swap the switching label 128 with a switching label 130. For example, the switching label 130 may include a value "33." The router R2 104 may be configured to forward the packet 124 with the switching label 130 to the router R3 106 via the link 114.

In some instances, the link 114 between the router R2 104 and the router R3 106 may be down. For example, the link 114 may fail due to a power outage, network congestion, operational human error, hardware failure, an unprecedented natural disaster or another reason. The FRR implementation may allow using the backup tunnel 122 via the router R5 110 upon the failure of the link 114. For example, the router R2 104 may still swap the switching label 128 with the switching label 130 and add an additional label 132 on top of it for forwarding the packet 124 to the preconfigured backup link 118. The label 132 may include a pre-configured FRR backup path label. For example, the preconfigured FRR backup path label may include a value "16" or any suitable value.

The router R3 106 may be a label switching router that may be configured to receive the packet 124 and to swap the switching label 130 with a switching label 134 (e.g., "40"). In some implementations, the router R3 106 may be configured as a penultimate router to the link destination. For example, a penultimate hop popping (PHP) enabled router may remove an outermost label of an LS packet before passing the packet to a next hop on the LSP. PHP functionality can be achieved by a label switching router by advertising an implicit-null label with a pre-defined value of "3" to its neighboring label switching router(s). The implicit-null may inform the neighboring label switching router (s) to perform PHP. After receiving the implicit-null label, the PHP enabled router may remove the outermost label and forward the packet to the next label switching router or the egress edge router. For example, the router R3 106 may send an implicit null label (e.g., "3") to the router R5 110 indicating to remove the outermost label of the packet before forwarding the packet to the router R3 106. After receiving the implicit null label, the router R5 110 may remove the outermost label of the packet 124. For example, the router R5 110 may remove the label 132 (e.g., "16") and forward the packet 124 without the label 132 to the router R3 106. Thus, the packet 124 destined to the router R3 106 may include the switching label 130 (e.g., "33") via the backup link 120. The router R3 106 may receive the packet 124 via the backup tunnel 122 with exactly the same switching label ("33") as it would have arrived via the primary link 114.

FIG. 2 illustrates a link protection mechanism using FRR implementation for two LSPs. In some instances, multiple LSPs can go through the same primary link. When a fault is detected, the entire link can be protected and not the individual LSPs. Thus, all the LSPs going through the primary link can be switched to the backup link.

A system 200 may include a router R1 202, a router R2 204, a router R3 206, a router R4 208 and a router R11 212. A first LSP may include the router R1 202, router R2 204, router R3 206, and the router R4 208. A second LSP may include the router R11 212, router R2 204, router R3 206, and the router R4 208. A first packet 218 may travel on the first LSP and a second packet 220 may travel on the second LSP. The first packet 218 may include an IP1 packet 222 with a switching label 224. For example, the switching label 224 may include a value "33." The second packet 220 may include an IP2 packet 226 with a switching label 228. For example, the switching label 228 may include a value "30." The first LSP and the second LSP may be configured to go through the routers R2 204, R3 206, R4 208. For example, the first LSP and the second LSP may go through the same primary link 214 between the router R2 204 and the router R3 206.

The router R2 204 may be a label switching router that may be configured to receive packets from multiple LSPs. The router R2 204 may swap the switching label for each packet with a corresponding new switching label for routing to the next hop on the respective LSP. For example, the router R2 204 may swap the switching label 224 for the first packet 218 with a new switching label 230 and the switching label 228 for the second packet 220 with a new switching label 232.

In some instances, if the link 214 between the router R2 204 and the router R3 206 fails, the FRR implementation may allow using a backup tunnel 216 via a router R5 210. For example, the router R2 204 may still swap the switching label for each packet with a new switching label and then add an FRR label on top of it for forwarding each packet to the preconfigured backup tunnel 216. For example, the router R2 204 may add an FRR label 234 on top of the switching label 230 and on top of the switching label 232. The FRR label 234 may include a pre-configured FRR backup path label. For example, the preconfigured FRR backup path label may include a value "21" or any suitable value.

The router R3 206 may be a label switching router that may be configured as a penultimate router to the link destination. For example, the router R3 206 may send an implicit null label (e.g., "3") to the router R5 210 indicating to remove the outermost label of each packet before forwarding each packet to the router R3 206. After receiving the implicit null label, the router R5 210 may remove the outermost label of each packet. For example, the router R5 210 may remove the outermost label 234 (e.g., "21") from the first packet 218 and the second packet 220 and forward each packet without the label 234 to the router R3 206. Thus, the first packet 218 and the second packet 220 destined to the router R3 206 may include the switching labels 230 (e.g., "333") and 232 (e.g., "33") respectively via the backup link 216. The router R3 206 may receive the first packet 218 and the second packet 220 via the backup tunnel 216 with exactly the same respective switching labels as they would have arrived via the primary link 214. The router R3 206 may be a label switching router that may be configured to swap the switching labels from the first packet 218 and the second packet 220 before forwarding to the router R4 208. For example, the router R3 206 may swap the switching label 230 (e.g., "333") to a switching label 236 (e.g., "50") for the first packet 218 and swap the switching label 232 (e.g., "33") to a switching label 238 (e.g., "60") for the second packet 220. The router R4 208 may be another label switching router or an egress edge router.

FIG. 3 illustrates a node protection mechanism using FRR implementation for a label switched path (LSP). FRR node protection implementation can allow bypassing a node in case of a failure. When a node fails for some reason, the traffic can be switched to a backup tunnel which terminates at the next-next-hop of the protected link. The label on the backup tunnel can be pre-configured so that the packets at the terminating end of the protected path of the LSP arrive exactly with the same label as if they have arrived over the primary link. This can be achieved using PHP functionality by signaling through implicit null label by the router at the terminating end of the protected path of the LSP.

As illustrated in the figure, a system 300 may include an LSP via a router R1 302, a router R2 304, a router R3 306, a router R4 308 and a router R6 310. The routers R2 304, R3 306 and R4 308 may be label switching routers. The router R2 304 may receive a packet 314 with a switching label 316 (e.g., "30") from the router R1 302. For example, the router R1 302 may be an ingress edge router or another label switching router.

In one instance, if the node R3 306 fails, the node R3 306 can be bypassed using a backup tunnel 324. However, unlike link protection mechanism, the label switching performed by the router R2 304 uses the label 320 instead of the label 318 for routing the packet via the backup tunnel 324. For example, the router R2 304 may swap the label 316 (e.g., "30") with the label 320 (e.g., "40") and attach an FRR label 322 on top of it for routing it via the backup tunnel 324. The FRR label 322 may include a pre-configured FRR backup path label. For example, the preconfigured FRR backup path label may include a value "15" or any suitable value. The router R4 308 may be configured to swap the switching label from the packet 314 before forwarding to the router R6 310. For example, the router R4 308 may swap the switching label 320 (e.g., "40") to a switching label 330 (e.g., "55") for the packet 314. The router R6 310 may be another label switching router or an egress edge router.

Figure 4:
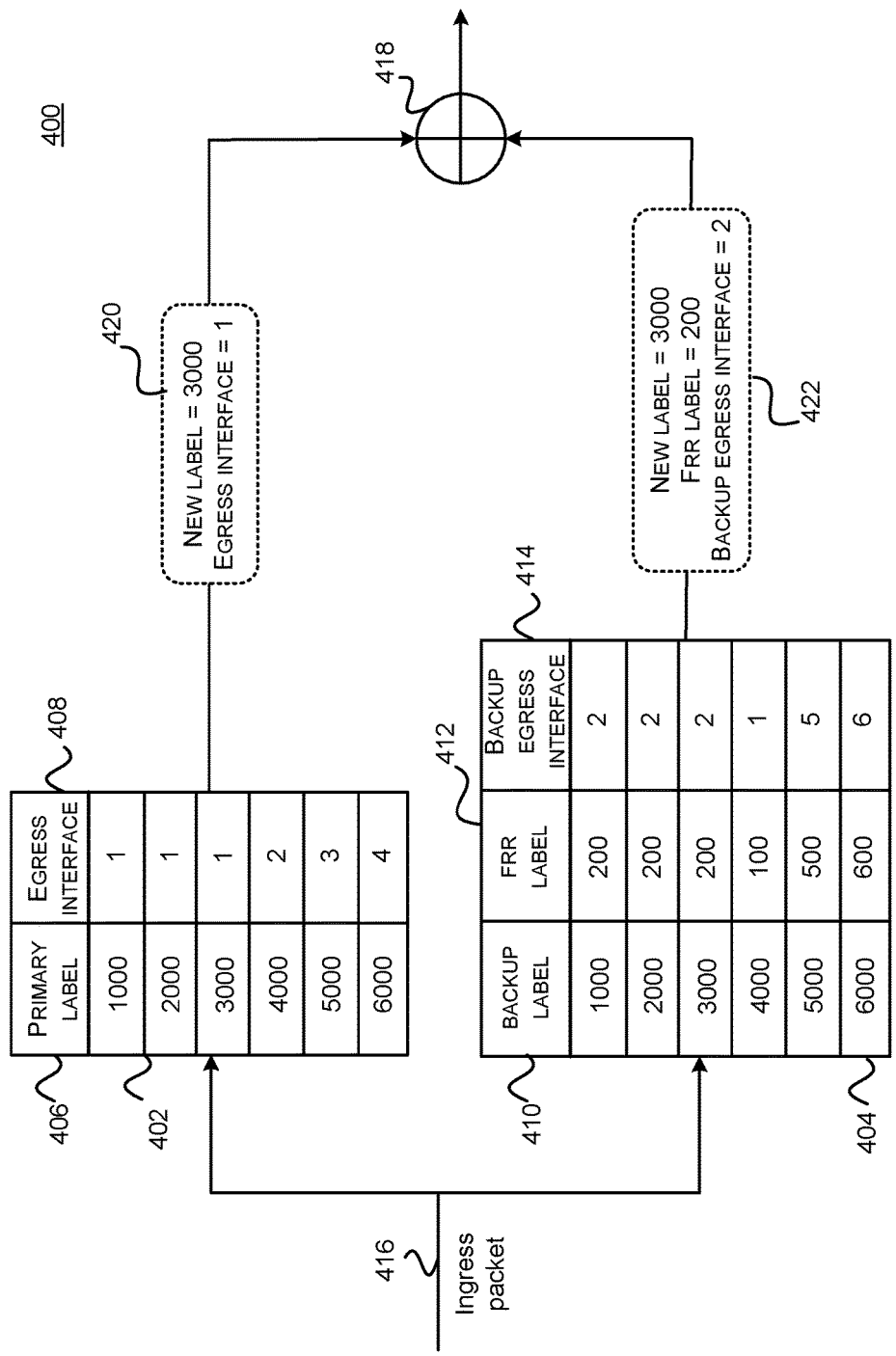
FIG. 4 illustrates a first FRR implementation utilizing duplicate resources.

FIG. 4 illustrates a first FRR implementation utilizing duplicate resources. In some implementations, duplicate tables may be maintained which can consume lot of compute and storage resources.

In some implementations, a first table 402 and a second table 404 may be utilized to store primary labels, backup labels, indicators for egress interfaces, and FRR labels for various LSPs. For example, the first table 402 may store an indicator for an egress interface 408 corresponding to a primary label 406 for a plurality of LSPs. The second table 404 may store an FRR label 412 and an indicator for a backup egress interface 414 corresponding to a backup label 410 for the plurality of LSPs.

As illustrated in the figure, when an ingress packet 416 with a header arrives, a primary label in the header may be used to lookup both the first table 402 and the second table 404 in parallel to determine primary link and backup link information. As illustrated in the first table 402, a value of the egress interface 408 includes "1" corresponding to a value "3000" of the primary label 406. For example, as shown by a box 420, the ingress packet 416 including the new label 3000 may be sent to the egress interface 1. As discussed with reference to FIG. 1, the primary label 406 may be attached to the packet 124 by the router R2 104 for routing to the router R3 106 via the link 114. If the link 114 fails, the router R2 104 may route the packet 124 with an FRR label via the backup tunnel 122. Referring back to the second table 404 in FIG. 4, the FRR label 412 corresponding to the value "3000" of the backup label 410 includes a value "200" and the backup egress interface 414 corresponding to the value "3000" of the backup label 410 includes a value "2." For example, as shown by a box 422, the ingress packet 416 including the new label 3000 and the FRR label 200 may be sent to the backup egress interface 2. A circuit 418 can route the ingress packet 416 via the primary link with the primary label "3000" if the egress interface 408 (e.g., "1") corresponding to the primary label 406 (e.g., "3000") is operational. If the egress interface 408 is not operational, the packet can be sent out with the FRR label "200" via the corresponding backup egress interface 414 (e.g., "2").

The first FRR implementation may require parallel lookup of the first table 402 and the second table 404 to determine the corresponding FRR label 412 and the backup egress interface 414 for the backup label 410 of the primary label 406. This implementation may require special hardware to perform the parallel lookup which can introduce high latency in the pipeline. In addition, two tables may consume lot of storage resources. Further, the two tables need to be maintained for all the LSPs which can cause CPU overhead resulting in significant traffic drop.

Figure 5:
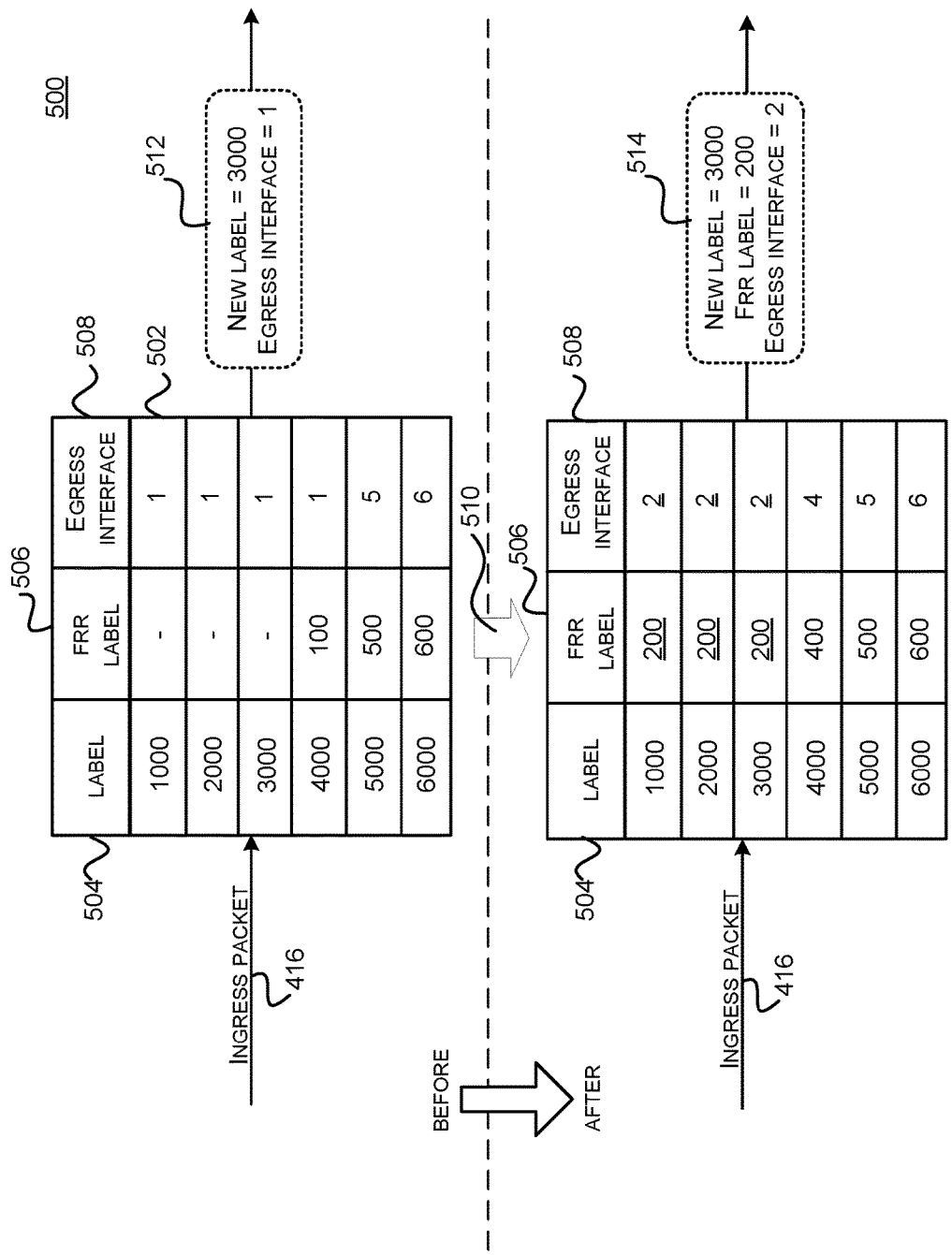
FIG. 5 illustrates a second FRR implementation utilizing dynamically updating tables.

FIG. 5 illustrates a second FRR implementation utilizing dynamically updating tables. In some implementations, the tables may be dynamically updated to determine FRR labels and backup interfaces which can consume lot of compute resources. This solution may require detection and reprogramming of LSPs dynamically which can result in significant amount of traffic drop due to CPU overhead.

As illustrated in the figure, a table 502 may include a label 504, an FRR label 506 and an egress interface 508. When a failure is detected, the table 502 may be updated dynamically, which may require reprogramming of the LSPs (as indicated by an arrow 510). For example, for a value "3000" of the label 504, the corresponding egress interface 508 is "1." When the link is operational, the ingress packet 416 can be sent out with the label "3000" via the egress interface "1" as illustrated by a box 512. When a failure is detected the FRR label 506 is updated with a value "200" and the egress interface 508 is updated with an updated value "2" corresponding to the value "3000" of the label 504. Thus, during the link failure, the packet can be sent out via the egress interface "2" with the FRR label "200" on top of the label "3000" as illustrated by a box 514.

The second FRR implementation may be lengthy and compute intensive as the detection and reprogramming of the backup links may need to be calculated dynamically. This can result in significant amount of traffic drop due to the CPU overhead.

Figure 6:
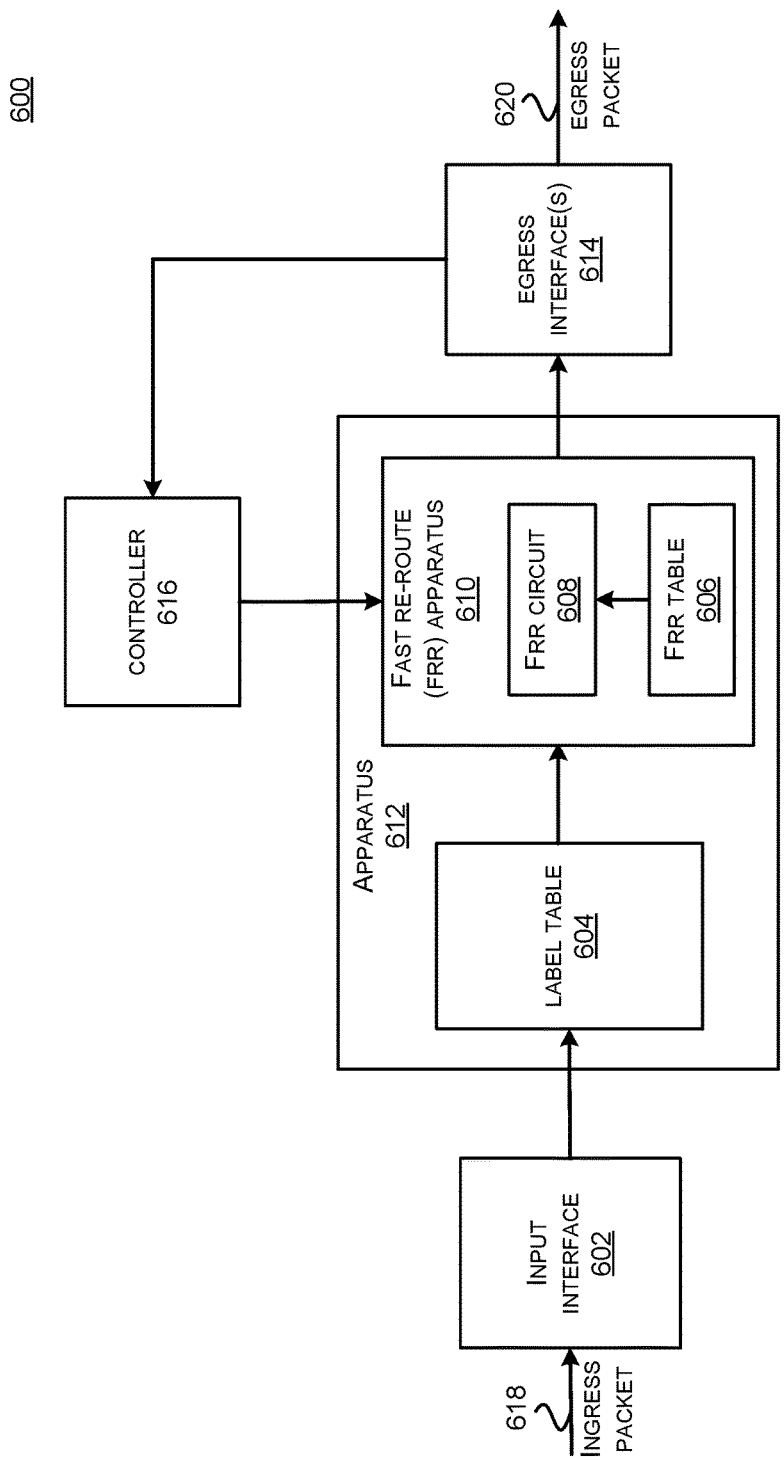
FIG. 6 illustrates a pipeline for FRR implementation, in accordance with some embodiments of the disclosed technologies.

FIG. 6 illustrates a high level diagram of an FRR system 600 for FRR implementation, in accordance with some embodiments of the disclosed technologies. The FRR system 600 may be used to implement the link protection and node protection mechanisms as discussed with reference to FIGS. 1-3.

The FRR system 600 may include an input interface 602, an apparatus 612, a controller 616 and egress interface(s) 614. The apparatus 612 may include a label table 604 and a fast re-route (FRR) apparatus 610. The FRR apparatus 610 may include an FRR table 606 and an FRR circuit 608. An example label table and an example FRR table are discussed with reference to FIG. 7. The FRR table can include pre-programmed values of the indicators for the backup interfaces, and backup labels (e.g., FRR labels) corresponding to each primary egress interface. Each backup egress interface can be associated with a logical port number or a physical port number. According to the embodiments, the FRR table can also include a backup indicator which can be dynamically updated upon detecting a link failure. For example, a controller can detect a link failure and update the value of the backup indicator in the FRR table to indicate the link failure. The controller can be an independent circuit or the CPU. In some implementations, the backup indicator, if true (e.g., "1") can indicate that the primary link is unavailable and a backup link has to be used instead of the primary link. The FRR table can also include destination MAC (D-MAC) addresses corresponding to each backup egress interface. The D-MAC address may indicate a physical network address of the next hop on the backup link. When the backup link is used, a corresponding backup label is attached to the packet and the packet can be sent out via the backup interface. In some implementations, some or all the components of the FRR system 600 may be part of a network device or may be implemented by different components of the network device. The network device may be a router, a switch, a node, a hub or any suitable network capable device. The network device may also be a processor, a system-on-chip (SoC), an application specific integrated circuit (ASIC), a field programmable gate array (FPGA), a system-in-package (SiP) or any suitable circuit.

The input interface 602 may be configured to receive a label switching (LS) packet, e.g., an ingress packet 618. The LS packet may be associated with an LSP. The LS packet may include a LS packet header comprising a label, also called a switching label. The LS packet header may include other control information along with the switching label, e.g., quality of service parameters, time-to-live (TTL), etc. In some implementations, the switching label may be a 20-bit value. In some embodiments, the LS packet may be an MPLS packet comprising an MPLS label. For example, the FRR system 600 may be part of the router R2 104 as discussed with reference to FIG. 1 and the label of the ingress packet 618 may include the switched label 130."

The label table 604 may be configured to provide an indicator for a primary egress interface for routing the LS packet based on the label. For example, the primary egress interface may be associated with a primary link used for routing the LS packet. In some implementations, the label table 604 may include D-MAC addresses associated with the primary egress interfaces. Referring back to FIG. 1, the primary egress interface may be associated with the link 114 for routing the LS packet to the router R3 106. In some embodiments, the primary egress interface may include a logical port number that can be mapped to a physical port associated with the primary link. In some implementations, the label table 604 may include a lookup table comprising multiple entries of indicators for the primary egress interfaces. The label from the LS packet can be used as an index to determine a corresponding primary egress interface from the label table 604. In some implementations, the label table 604 may include 2048 entries. The label table 604 may be implemented as a look-up table, a cache, a buffer or using any suitable memory implementation. An example label table is discussed with reference to FIG. 7.

The FRR table 606 may be configured to store a backup indicator, an indicator for a backup egress interface and an FRR label, corresponding to the primary egress interface. In some embodiments, the FRR table 606 may be pre-configured to store the backup indicator, the indicator for the backup egress interface and the FRR label corresponding to each primary egress interface. For example, an indicator for an egress interface may include a physical port number, a logical port number, or any suitable indicator. In some embodiments, the FRR table 606 may include multiple entries corresponding to multiple primary egress interfaces. For example, in one implementation, the FRR table 604 may include 256 entries for 256 primary egress interfaces. According to the embodiments, the backup indicator associated with the primary egress interface received from the label table 602 may be used to determine if a backup link has to be used in place of the primary link.

The controller 616 may be configured to determine whether the primary egress interface is operating or not operating. In some instances, the controller 616 may detect a network link failure associated with a primary egress interface. For example, the link failure may be detected using loss of signal (LOS), BFD protocol, determination hardware state machine or any suitable mechanism. The link failure may be caused due to fiber cable cuts, power outages, network congestion, operational human errors, server hardware failure, unprecedented natural disasters, faults or errors in network devices, etc. According to the embodiments, upon detecting the link failure, the controller 616 may be configured to update the backup indicator in the FRR table corresponding to the primary egress interface associated with the failed link to indicate that the primary egress interface is not operating. For example, the controller 616 may set the backup indicator to "TRUE" or "1" in the FRR table corresponding to the non-operational primary egress interface. The controller 616 may be an independent entity or the CPU, e.g., the CPU of the network device.

The FRR circuit 608 may be configured to determine whether the backup link has to be used in place of the primary link based on the backup indicator. For example, a value of "1" for the backup indicator may indicate that the corresponding primary egress interface is not operating and a value of "0" for the backup indicator may indicate that the corresponding primary egress interface is operating. In some implementations, the backup indicator may be stored in the FRR table 606, a status register, an on-chip memory (e.g., SRAM), or a discrete memory. The FRR circuit 608 may include circuitry to read the backup indicator and, based on the backup indicator, determine whether the primary egress interface or the backup egress interface has to be used for sending the LS packet. For example, a value of "1" for the backup indicator may indicate to use the backup egress interface and a value of "0" may indicate to use the primary egress interface. The FRR circuit 608 may also be configured to provide the FRR label for sending the LS packet with the FRR label based on the backup indicator. For example, when the backup indicator is set to "1", the FRR circuit 608 may send the LS packet with the FRR label to the backup egress interface, and when the backup indicator is set to "0", the FRR circuit 608 may send the LS packet without the FRR label to the primary egress interface.

Figure 7:
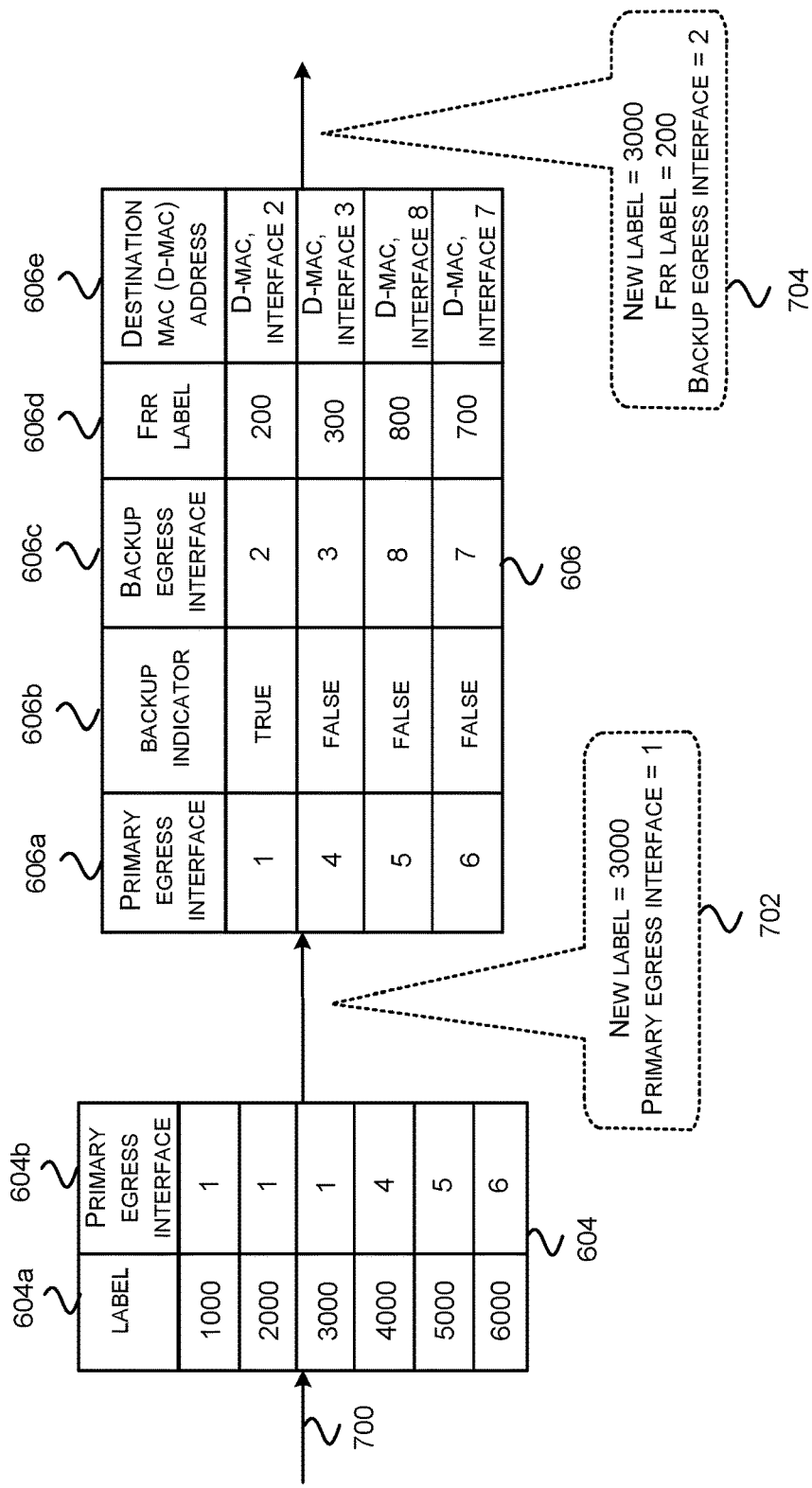
FIG. 7 illustrates an example label table and an example FRR table implementation in one embodiment.

FIG. 7 illustrates an example label table and an example FRR table implementation in one embodiment.

As illustrated in FIG. 7, the label table 604 may include multiple entries for label(s) 604a and corresponding indicators for primary egress interface(s) 604b for packets associated with various LSPs. For example, the label table 604 may receive an LS header 700 for an LS packet associated with an LSP. In some embodiments, the FRR system 600 may be part of the router R2 104 as discussed with reference to FIG. 1. The LS packet received by the label table 604 may be similar to the packet 124. The router R2 104 may perform a label swap operation to swap the label 128 of the LS packet with a new label 130 that includes a value "3000." For example, the label swap operation may have been performed in an earlier stage of the pipeline for the network device prior to the pipeline for the FRR system 600. As illustrated in the label table 604 in FIG. 6, the value "3000" for the label 604a may correspond to a value "1" for the primary egress interface 604b. For example, in one implementation, a lookup operation may be performed using the label 604a to determine the corresponding indicator for the primary egress interface 604b. Referring back to FIG. 1, the value "1" for the primary egress interface 604b may be associated with the link 114 which may be a primary link for that LSP. If the primary link is operational, the LS packet with the label "3000" may be routed to the router R3 106 via the primary link based on the egress logical interface "1" as shown by a box 702. In embodiments of the technology, the FRR table 606 may be accessed to determine whether a backup link has to be used in place of the primary link if the primary link is not operational.

As illustrated in FIG. 7, the FRR table 606 may include multiple entries for associating a primary egress interface 606a and a corresponding backup indicator 606b, a backup egress interface 606c, an FRR label 606d and a destination MAC (D-MAC) address 606e. According to the embodiments, the FRR table 606 may store pre-programmed backup path information in order to minimize the switchover time upon a link failure. For example, the entries may be programmed at power up, when the LSP is configured or at any suitable time. In one implementation, the FRR table 606 may include 256 entries for a total 256 egress interfaces. Thus embodiments of the disclosed technologies utilize a super optimized FRR table with minimal required label space. The FRR table 606 may be implemented in software, hardware or a combination thereof. For example, the FRR table 606 may be implemented as a buffer, a lookup table, a cache, etc.

The primary egress interface 606a may indicate a logical interface or a physical interface for routing the LS packet. For example, in some implementations, the primary egress interface 606a may indicate a logical network port number, e.g., 1, 4, 5 or 6. Each logical port number may be mapped to a corresponding physical network port (e.g., an Ethernet port) for sending the packet out to the next hop on the LSP. In some implementations, one or more logical ports may be mapped to a physical port using a link aggregation control protocol (LACP). In some embodiments, the primary egress interface 606a can be used as an index into the FRR table 606 to determine if the corresponding backup indicator 606b is set to "TRUE" or "FALSE." For example, the backup indicator 606b may be set to "TRUE" by the controller 616 upon detecting a link failure associated with the primary egress interface 606a. According to one embodiment, the backup indicator 606b set to "TRUE" may indicate that a link used by the corresponding primary egress interface 606a is not operational and a backup link using a corresponding backup egress interface 606c may be used. For example, the FRR circuit 608 may determine that the primary egress interface 606a is not operational based on the backup indicator 606b.

The backup egress interface 606c may indicate a logical or a physical port number to be used for the backup link. Referring to the first entry in the FRR table 606, the backup egress interface 606c corresponding to the "TRUE" value of the backup indicator 606b indicates a backup port number "2." This may correspond to a port number "2" used for the backup link when the primary link on the port number "1" based on the primary egress interface 606a is down. Referring back to FIG. 1, the link 114 may be associated with the primary egress interface 606a. Therefore, when the link 114 is down, the router R2 104 may use the backup tunnel 122 via the backup port number "2." The router R2 104 may also attach the FRR label "200" corresponding to the primary egress interface "1" to the packet for routing through the backup tunnel 122. The packet including the label "3000" and the FRR label "200" on top of the label "3000" may be routed to the router R5 110 via the port "2" specified by the backup egress interface 606c. The DMAC address 606e for backup egress interface "2" may correspond to a physical network address of the router R5 110 on the backup path.

Referring back to FIG. 6, the egress interfaces 614 may be configured to send an egress packet 620 for routing to a next hop on the LSP. The egress interfaces 614 may include a plurality of egress interfaces. A first egress interface from the egress interfaces 614 may be used as a primary egress interface and a second egress interface may be used as a backup egress interface if the first egress interface is not operational. In some embodiments, a first egress interface from the plurality of egress interfaces may be configured as the primary egress interface to send the LS packet without the FRR label when the primary egress interface is operating and a second egress interface from the plurality of egress interfaces may be configured as the backup egress interface to send the LS packet with the FRR label when the primary egress interface is not operating. For example, if the primary egress interface is not operating, the egress packet 620 may include an FRR label in addition to the switching label in the packet header. If the primary egress interface is operating, the egress packet 620 may include the switching label in the packet header. For example, referring back to FIG. 7, in one instance, if the primary egress interface 606a is not operating, the backup egress interface 606c from the egress interfaces 614 may be used to send the egress packet 620. If the egress interface is operating, the primary egress interface 606a may be used to send the egress packet 620. The FRR label may be removed by a PHP router on the backup link, as discussed with reference to FIGS. 1-3. The next hop router on the primary link may receive the LS packet via the backup link using the backup egress interface with exactly the same switching label as they would have arrived via the primary link using primary egress interface.

In some embodiments, the label table 604 may be part of a first stage of a pipeline of the network device and the FRR apparatus 610 may be part of a second stage of the pipeline. Each stage of the pipeline may include their respective internal pipelines. The FRR table 606 as discussed above can allow the switchover to the backup link in negligible time (close to zero milliseconds) since all the backup link information can be pre-programmed in the FRR table 606 and the switchover time may be based only on the time used to flip the backup indicator bit. For example, the FRR label, and the backup link (backup egress interface 606c) may be pre-determined in a previous stage of the pipeline and the determination of using the primary link or the backup link can be based on detecting the backup indicator 606b before sending the packet out to the next hop on the LSP. The FRR apparatus 610 may be part of a pipeline executed by a network device, as described with reference to FIG. 8.

Figure 8:
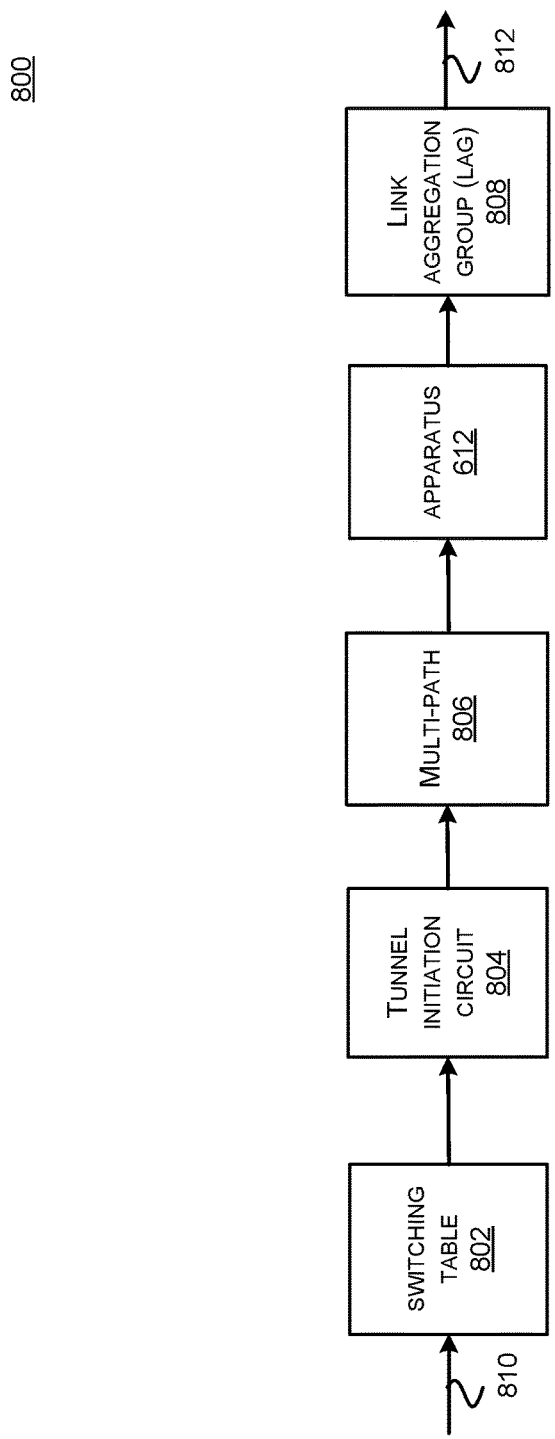
FIG. 8 illustrates multiple stages of a pipeline for a network device, in one embodiment.

FIG. 8 illustrates multiple stages of a pipeline 800 for a network device, in one embodiment. The network device may be a router, e.g., similar to a router discussed with reference to FIGS. 1-3. In some embodiments, the network device may be similar to the network device 1100 discussed with reference to FIG. 11 and FIG. 12.

The example pipeline 800 may include multiple stages, e.g., a switching table 802, a tunnel initiation circuit 804, a multi-path routing circuit 806, the apparatus 612, and a link aggregation group (LAG) 808.

The switching table 802 may be configured to receive a label switching (LS) packet 810. The LS packet 810 may comprise an LS header. The LS header may include a switching label. For example, the LS packet may be an MPLS packet comprising an MPLS header further comprising an MPLS label. The switching table 802 may perform a label switching on the LS label using the LS header and provide a new label. For example, the new label may be used to determine an egress interface for routing the LS packet 810 to a next hop on the LSP.

The tunnel initiation circuit 804 may be configured to initiate a tunnel. For example, the tunnel initiation circuit 804 may initiate a tunnel for an LSP from a group of tunnels. In some implementations, the tunnel initiation circuit 804 may include a tunnel group table and a tunnel pointer table for a tunnel lookup. The tunnel initiation circuit 804 may be configured to select a tunnel from a tunnel group based on a tunnel hash value.

The multi-path routing circuit 806 may be used to load balance the traffic over multiple paths for a next-hop packet forwarding. For example, each tunnel may be spread across multiple interfaces. The multi-path routing circuit 806 may implement any known protocol, e.g., weighted cost multi-path (WCMP) or equal code multipath (ECMP) to implement multi-path routing functionality.

The apparatus 612 may execute one of the stages of the pipeline 800. For example, as discussed with reference to FIGS. 6 and 7, the apparatus may receive an LS packet with a new switching label provided by the switching table 802. The apparatus 612 may provide a primary egress interface or a backup egress interface for the LS packet based on a backup indicator. The primary link may be setup by the tunnel initiation circuit 804 and the multi-path circuit 806.

The link aggregation group (LAG) 808 may be configured to combine a number of physical ports together to make a single high-bandwidth data path. The LAG 808 may be used to implement the traffic load sharing among the member ports in the group and to enhance the connection reliability. For example, the LAG 808 may implement link aggregation by aggregating multiple network connections in parallel to allow increased throughput and to provide redundancy in case of a link failure. In some embodiments, the LAG 808 may implement Link Aggregation Control Protocol (LACP) to control the bundling of several physical ports together to form a single logical channel for forwarding the packets.

Figure 9:
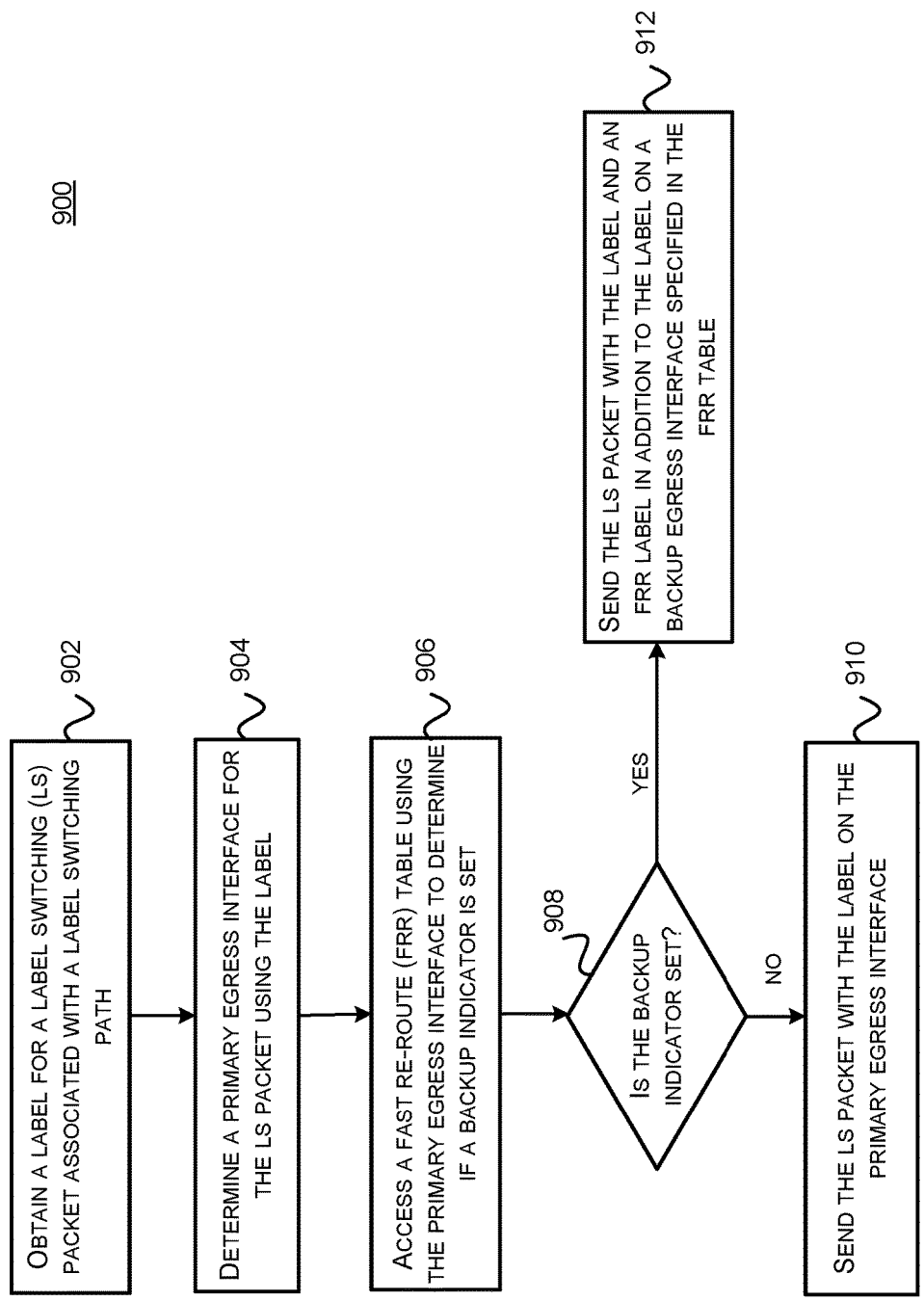
FIG. 9 illustrates a method for FRR implementation for link protection, in one embodiment.

FIG. 9 illustrates a method 900 for FRR implementation for link protection, in one embodiment. In some embodiments, the method 900 may be executed by the apparatus 612 that may be part of a network device executing the pipeline 800.

In step 902, a label can be obtained for a label switching (LS) packet associated with a label switching path (LSP). For example, the label can be a switching label which can be obtained from a switching table. Referring back to FIG. 8, the LS packet may be the LS packet 810 and the label can be obtained using the switching table 802. The label may be received by the input interface 602 of the apparatus 612 as part of the header for the ingress packet 618.

In step 904, a primary egress interface may be determined for the LS packet using the label. Referring back to FIG. 6, the label table 604 may receive the label via the input interface 602 and provide a corresponding primary egress interface. As discussed with reference to FIG. 7, the label may be the label 604a and the primary egress interface may be the primary egress interface 604b. For example, in one instance, the primary egress interface may include the value "1" and the label may include the value "3000." The primary egress interface may be associated with a logical or physical port that can be used to send the LS packet to a next hop on the LSP.

In step 906, an FRR table can be accessed using the primary egress interface to determine if a backup indicator is set. Referring back to FIG. 7, the FRR table 606 can be accessed by the FRR circuit 608 to determine if the backup indicator 606b is set corresponding to the primary egress interface 606a. In some implementations, a value of "1" for the backup indicator 606b may indicate that the backup indicator 606b is set or "TRUE." For example, the FRR table 606 may be pre-configured with the FRR label and the backup egress interface corresponding to the primary egress interface prior to receiving the LS packet.

In step 908, the value of the backup indicator is detected. As discussed with reference to FIGS. 6-7, the value of the backup indicator 606b is detected to determine if the primary link is or the backup link has to be used to send the LS packet to the next hop. For example, as discussed with reference to FIG. 6, the backup indicator 606b may be set up by the controller 616 upon determining a link failure on the primary egress interface.

In step 910, if the backup indicator is not set, the LS packet is sent with the label on the primary egress interface. For example, as discussed with reference to FIG. 6, the primary egress interface may be a first egress interface from the egress interfaces 614. Referring back to FIG. 7, if the backup indicator 606b is not set (e.g., "FALSE"), the LS packet is sent with the label 604a on the primary egress interface 606a. For example, the LS packet is sent with the label "3000" on the primary egress interface "1."

In step 912, if the backup indicator is set, the LS packet is sent with the label and an FRR label in addition to the label on a backup interface specified in the FRR table. Referring back to FIG. 7, if the backup indicator 606b is set (e.g., "TRUE"), the LS packet is sent with the label 604a and the FRR label 606d in addition to the label 604a on the backup egress interface 606c. As discussed with reference to FIG. 6, the backup egress interface 606c may be a second egress interface from the egress interfaces 614. For example, the LS packet is sent with the label "3000" and the FRR label "200" on the backup egress interface "2." A PHP router on the backup link can remove the FRR label "200" after receiving an implicit-null (e.g., "3") from a next-hop destination router and send the LS packet with the label "3000" to the next-hop destination router as discussed with reference to FIG. 1.

As discussed above with reference to the method 900, the step 908 to determine whether the backup indicator is set or not may happen after determining the new label and the primary egress interface. Since the FRR labels and the backup egress interfaces are pre-programmed in the FRR table for each primary egress interface, the switchover time to the backup link may depend on execution of the step 908, which may be very minimal. The backup indicator may be set after detecting a link failure as discussed with reference to a flow chart in FIG. 10.

Figure 10:
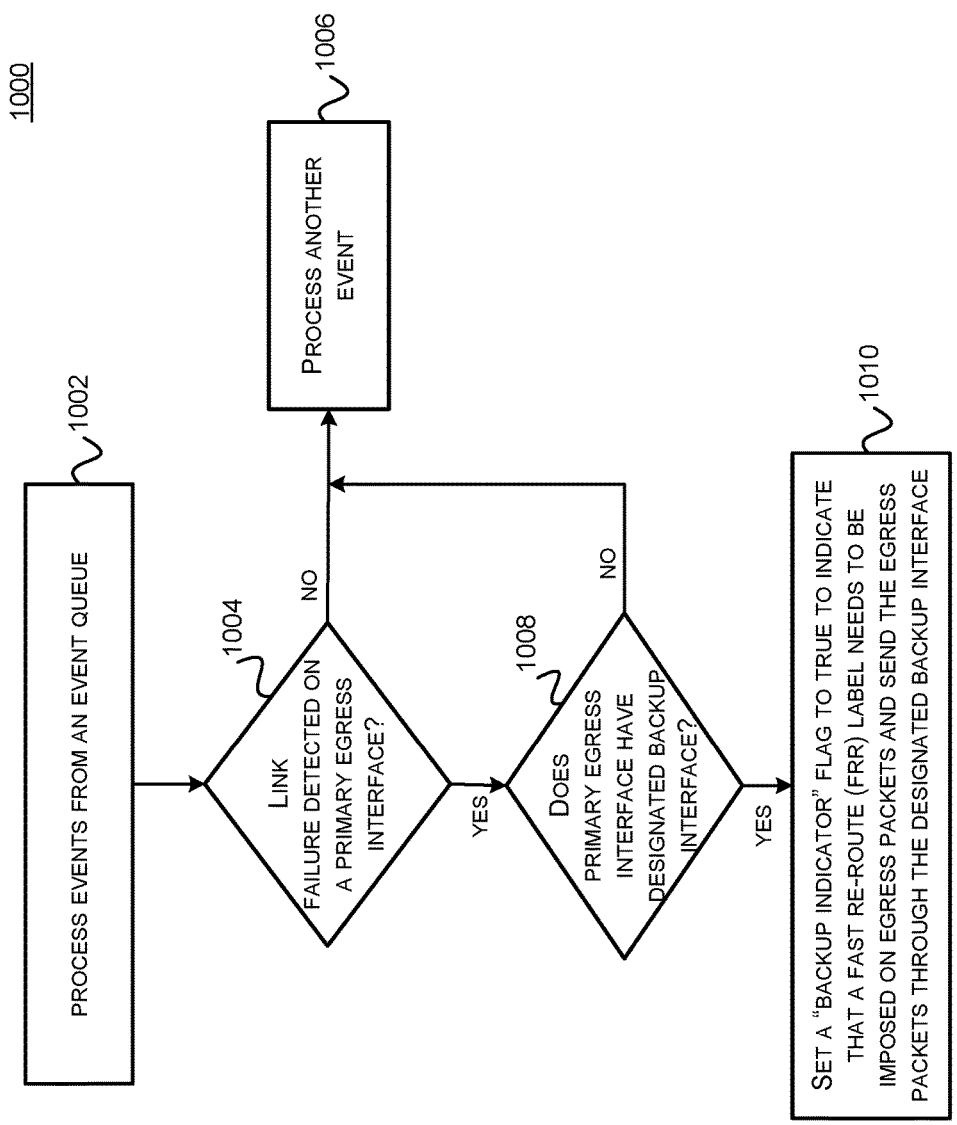
FIG. 10 illustrates a method for updating a backup indicator, in one embodiment.

FIG. 10 illustrates a method 1000 for updating a backup indicator, in one embodiment. The method 1000 may be executed by a CPU in the network device comprising the apparatus 612 or by the controller 616. For example, the CPU may be part of the processing logic as discussed with reference to FIG. 11. It will be noted that the steps of the method 1000 are explained with reference to a CPU, however, it will be understood that, in some implementations, one or more steps of the method 1000 may be executed by the controller 616.

In step 1002, the CPU may process events from an event queue. For example, a high priority event queue may log multiple events that need to be processed by the CPU. For example, the queue may log an event associated with a link failure on any of the egress interfaces. The egress interfaces may be mapped to a logical or physical port of the network device.

In step 1004, the CPU may determine if the link failure is detected on a primary egress interface. Referring back to FIG. 7, the link failure may be detected on any of the primary egress interface 606a. For example, the link failure may be detected using loss of signal (LOS), BFD protocol, determination hardware state machine or any suitable mechanism. The link failure may be caused due to fiber cable cuts, power outages, network congestion, operational human errors, server hardware failure, unprecedented natural disasters, faults or errors in network devices, etc.

In step 1006, if there is no link failure detected, the CPU may process another event, e.g., the next event in the queue.

In step 1008, if a link failure is detected, the CPU may determine if the primary egress interface has a designated backup interface. For example, in some instances, the FRR table 606 may not include an entry for the backup egress interface 606c corresponding to a value of the primary egress interface 606a. If there is no entry for the backup egress interface 606c in the FRR table 606, the CPU may process another event as discussed with reference to the step 1006.

In step 1010, if the primary egress interface has a designated backup interface, the CPU may set a backup indicator flag to "TRUE" to indicate that an FRR label needs to be imposed on egress packets and send the egress packets through the designated backup interface. Referring back to FIG. 7, the CPU may set an entry for the backup indicator 606b corresponding to the egress logical interface 606 a to "TRUE" to indicate that the corresponding FRR label 200 may be imposed on the egress packet and the egress packet may be sent through the corresponding backup egress interface 606c.

Various embodiments of the disclosed technologies can allow switching the traffic to a backup link in a minimal amount of time upon detecting a link failure. For example, according to some embodiments, the switchover time may be negligible or close to zero milliseconds. In addition, the embodiments can provide extremely resource optimized implementation of the fast re-route (FRR) features. According to the embodiments, all the backup paths can be pre-programmed and the switchover from a primary link to a backup link can be performed based on a backup interface flag stored in a memory or a register. Thus the embodiments can provide a robust FRR implementation with negligible traffic drop upon detecting the link failure as the switchover can happen in a minimal amount of time.

Figure 11:
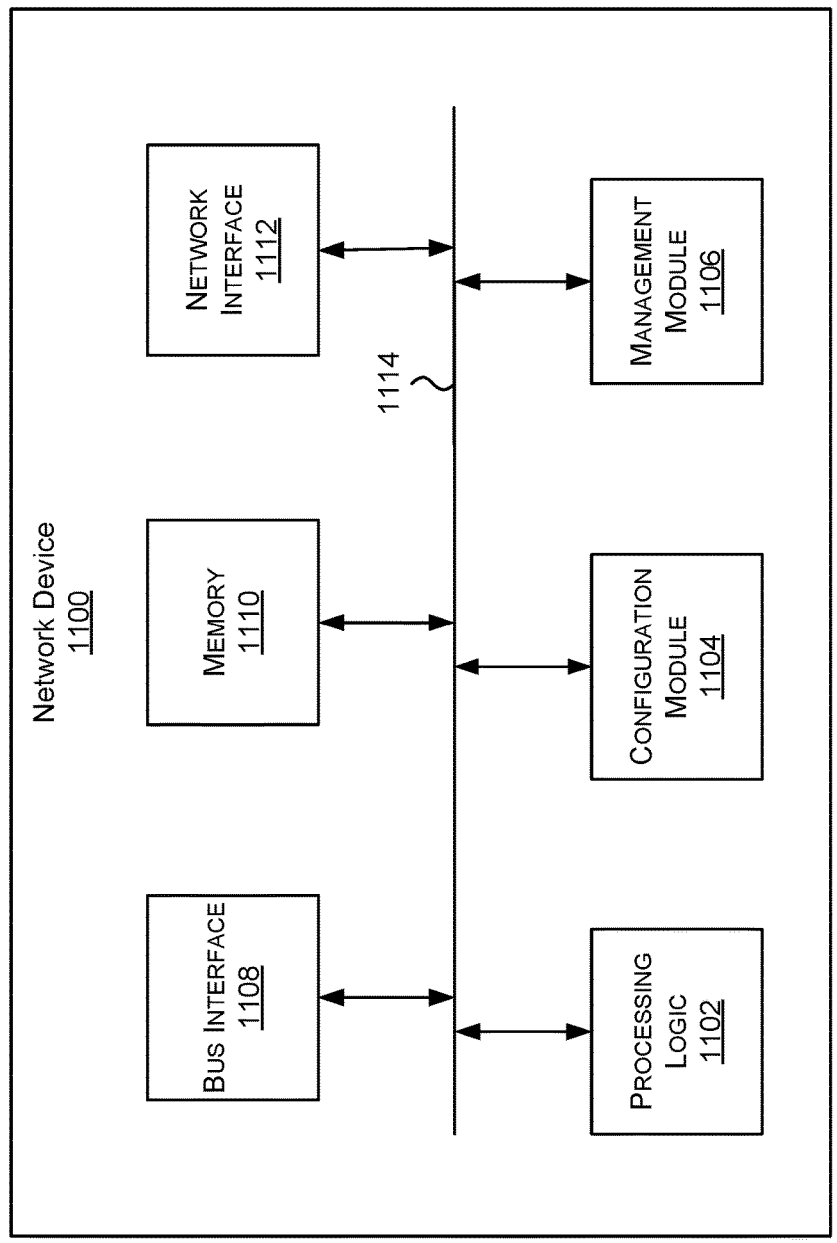
FIG. 11 illustrates an example architecture for features and systems described herein that includes one or more service provider computers and/or a user device connected via one or more networks, according to some embodiments.

FIG. 11 illustrates an example of a network device 1100. Functionality and/or several components of the network device 1100 may be used without limitation with other embodiments disclosed elsewhere in this disclosure, without limitations. For example, the network device may include functionality or components of the FRR system 600 as discussed with reference to FIG. 6. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 12. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1104 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
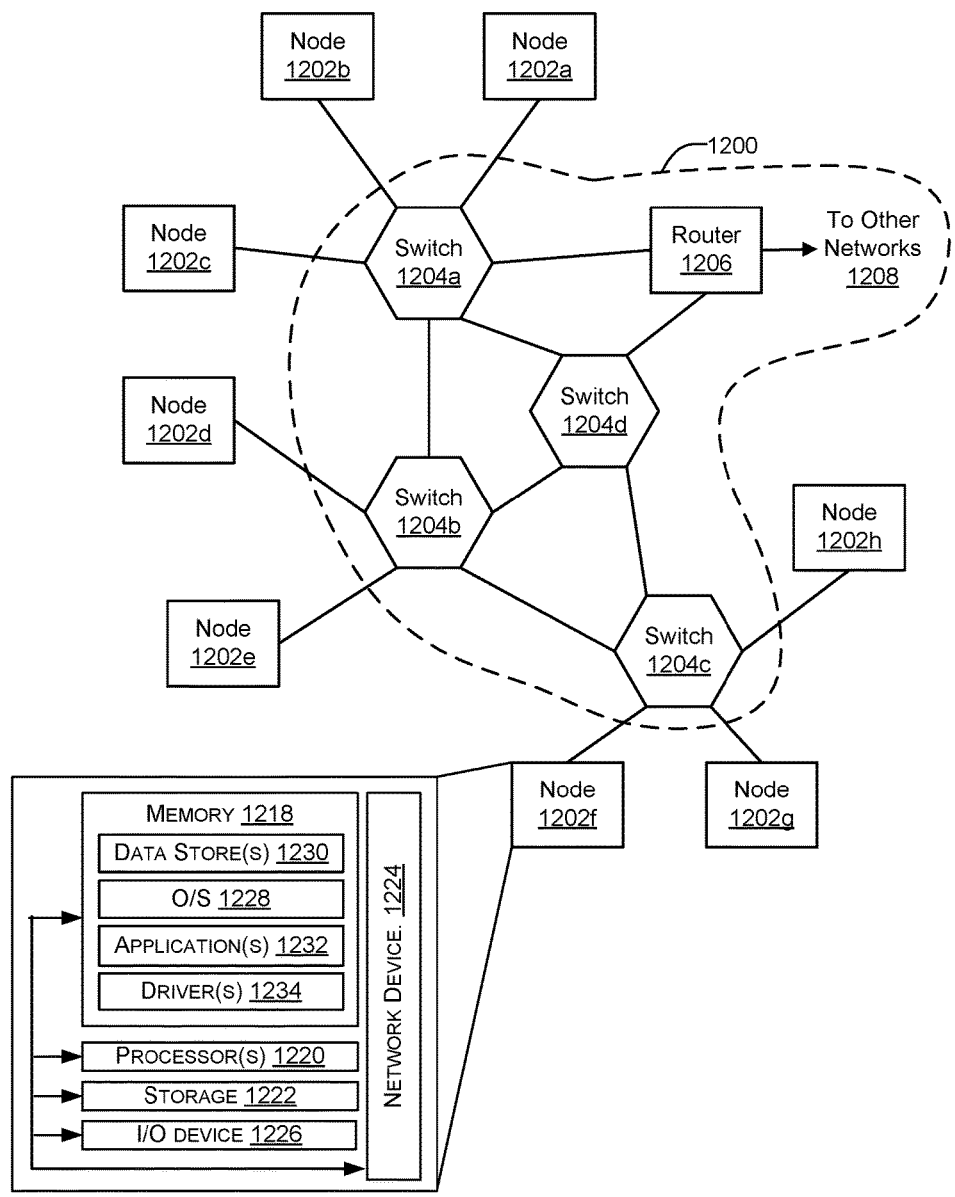
FIG. 12 illustrates aspects of an example environment of a computing system for implementing aspects in accordance with some embodiments.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204*a*-1204*d*, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204*a*-1204*d* may be connected to a plurality of nodes 1202*a*-1202*h* and provide multiple paths between any two nodes.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204*a*-1204*d* and router 1206, if present, may be referred to as a switch fabric, a fabric, a network fabric, or simply a network. In the context of a computer network, terms "fabric" and "network" may be used interchangeably herein.

Nodes 1202*a*-1202*h* may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202*a*-1202*h* may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202*a*-1202*h*, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202*a*-1202*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. In some embodiments, the memory 1218 may include instructions to execute the method 900 and 1000. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1226 that allow the node(s) 1202a-1202h to communicate with a stored database, another computing device or server, user terminals and/or other devices on the network (s) 1200. The network device(s) 1224 of FIG. 12 may include similar components discussed with reference to the network device 1100 of FIG. 11.

In some implementations, the network device 1226 is a peripheral device, such as a PCI-based device. In these implementations, the network device 1226 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1226 may be connected to a computing system using a PCIe interface.

A PCI-based device may include one or more functions. A "function" describes operations that may be provided by the network device 1226. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1226 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
   an input interface configured to receive a label switching (LS) packet comprising a first label;
   a label table configured to provide an indicator for a primary egress interface for routing the LS packet based on the first label;
   a fast re-route (FRR) table configured to provide a backup indicator, an indicator for a backup egress interface, and an FRR label, corresponding to the primary egress interface, wherein the FRR table is programmed with the indicator for the backup egress interface, and the FRR label prior to receiving the LS packet;
   a controller configured to determine that the primary egress interface is not operating and to update a value of the backup indicator in the FRR table to indicate that the primary egress interface is not operating; and
   an FRR circuit coupled to the FRR table, wherein the FRR circuit is configured, based on the backup indicator, to send the LS packet with the FRR label to the backup egress interface when the primary egress interface is not operating, and to send the LS packet without the FRR label to the primary egress interface when the primary egress interface is operating.

2. The network device of claim 1, wherein the LS packet is associated with a first label switching path (LSP) and wherein the network device is a first label switching device.

3. The network device of claim 2, wherein the primary egress interface is associated with a second label switching device on the first LSP.

4. The network device of claim 2, wherein the backup egress interface is associated with a third label switching device on a second LSP.

5. An apparatus comprising:
   a memory configured to:
      store an indicator for a first interface corresponding to a first label; and
      store a backup indicator, a backup label, and an indicator for a backup interface corresponding to the first interface, wherein the backup indicator indicates whether the first interface is operating; and
   a circuit coupled to the memory and configured to:
      receive a label switching (LS) packet header for an LS packet associated with the first interface, the LS packet header comprising the first label;
      determine, based on the backup indicator, that the first interface is not operating; and upon determining that the first interface is not operating, provide the backup label with the LS packet header for sending the LS packet to the backup interface.

6. The apparatus of claim 5, wherein the apparatus is part of a network device configured to execute a pipeline comprising multiple stages, wherein a first stage of the pipeline is configured to determine the first interface, wherein the first interface sends the LS packet without the backup label when the first interface is operating.

7. The apparatus of claim 6, wherein the circuit forms a second stage of the pipeline.

8. The apparatus of claim 5, wherein the LS packet is a multiprotocol label switching packet (MPLS) and wherein the LS packet header includes an MPLS label.

9. The apparatus of claim 5, wherein the memory is further configured to store a destination media access control (D-MAC) address corresponding to the backup interface.

10. The apparatus of claim 5, wherein the apparatus is part of a first network device on a label switching path (LSP), wherein the first network device is configured to communicate with a second network device on the LSP via a network link communicatively coupled to the first interface.

11. The apparatus of claim 10, wherein the first interface is not operating due to a failure of the network link.

12. The apparatus of claim 10, wherein the first network device and the second network device are label switching routers.

13. The apparatus of claim 5, wherein the first interface includes a logical interface or a physical interface.

14. The apparatus of claim 5, wherein the backup interface includes a logical interface or a physical interface.

15. The apparatus of claim 5, wherein the memory includes a fast re-route (FRR) table and the backup label includes an FRR label.

16. The apparatus of claim 5, wherein the backup indicator includes a field that indicates whether the first interface is operating.

17. The apparatus of claim 5, wherein the apparatus is implemented as an application specific integrated circuit (ASIC), a field programmable gate array (FPGA) or a system-in-package (SIP).

18. A computer-implemented method comprising:
    storing, by a network device, in a memory, a backup label, a backup indicator and an indicator for a backup interface, corresponding to a primary interface, wherein the backup indicator indicates whether the primary interface is operating;
    receiving a label switching (LS) packet comprising a first label, the first label corresponding to the primary interface;
    determining that the primary interface is not operating;
    upon determining that the primary interface is not operating, updating a value of the backup indicator in the memory to indicate that the primary interface is not operating; and
    sending, based on the backup indicator, the LS packet with the backup label to the backup interface if the primary interface is not operating or without the backup label to the primary interface if the primary interface is operating.

19. The computer-implemented method of claim 18, wherein the backup interface is a logical interface that is mapped to a physical interface.

20. The computer-implemented method of claim 18, the method further comprising:
    prior to determining that the primary interface is not operating, detecting a network link failure, wherein the network link is associated with the primary interface.

* * * * *